(12) United States Patent
Suto (10) Patent No.: US 8,014,043 B2
(45) Date of Patent: Sep. 6, 2011

(54) DISPLAY SYSTEM

(75) Inventor: Yasuhiro Suto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 674 days.

(21) Appl. No.: 12/173,863

(22) Filed: Jul. 16, 2008

(65) Prior Publication Data

US 2009/0021800 A1   Jan. 22, 2009

(30) Foreign Application Priority Data

Jul. 20, 2007   (JP) ................. 2007-189285

(51) Int. Cl.
*H04N 1/04* (2006.01)

(52) U.S. Cl. ....... 358/474; 358/505; 358/1.15; 358/498; 399/364; 399/367; 345/173; 348/739

(58) Field of Classification Search ................. 358/474, 358/1.15, 505, 401, 448, 497, 496, 498; 399/364, 399/367, 371, 374; 345/173, 30; 348/739
See application file for complete search history.

(56) References Cited

U.S. PATENT DOCUMENTS

| | | | | |
|---|---|---|---|---|
| 5,181,129 | A * | 1/1993 | Sato et al. ..................... | 358/494 |
| 5,440,403 | A * | 8/1995 | Hashimoto et al. ........... | 358/444 |
| 6,661,542 | B1 * | 12/2003 | Mangerson ................... | 358/484 |
| 7,164,486 | B1 * | 1/2007 | Nakamura et al. ............ | 358/1.15 |
| 7,918,568 | B2 * | 4/2011 | Montierth et al. ............ | 353/121 |
| 2006/0077458 | A1 * | 4/2006 | Miyazaki ..................... | 358/1.15 |
| 2009/0293020 | A1 * | 11/2009 | Nakai et al. ................... | 715/838 |
| 2009/0316201 | A1 * | 12/2009 | Nakai et al. .................. | 358/1.15 |
| 2010/0027066 | A1 * | 2/2010 | Nakai et al. .................. | 358/1.15 |
| 2010/0091315 | A1 * | 4/2010 | Shiraki ........................ | 358/1.13 |
| 2010/0149590 | A1 * | 6/2010 | Nishiyama et al. .......... | 358/1.15 |

FOREIGN PATENT DOCUMENTS

| | | |
|---|---|---|
| JP | 61-177887 | 11/1986 |
| JP | 02-027864 | 1/1990 |
| JP | 05-150586 | 6/1993 |
| JP | 05-308476 | 11/1993 |
| JP | 06-009064 | 1/1994 |
| JP | 07-115503 | 5/1995 |
| JP | 10-333594 | 12/1998 |
| JP | 2000-029252 | 1/2000 |
| JP | 2000-043485 | 2/2000 |
| JP | 2005-049486 | 2/2005 |
| JP | 2006-284804 | 10/2006 |

OTHER PUBLICATIONS

Co-Pending U.S. Appl. No. 12/166,508, filed Jul. 2, 2008.

* cited by examiner

*Primary Examiner* — Negussie Worku (74) *Attorney, Agent, or Firm* — Renner, Otto, Boisselle & Sklar, LLP (57) ABSTRACT

The display system includes the display apparatus and the scanner apparatus disposed so as to be drawable forward below the display apparatus. In addition, the upper unit is attached so as to be openable and closeable to the lower unit. Moreover, in the scanner apparatus, a sheet-like original, an image of which is read by the image reading device, can be fed from a front side of the upper unit. In addition, when the image of the sheet-like original is read by the scanner apparatus, the original is fed from the front face side of the scanner apparatus to read the original image, and when an image of a book original is read, the scanner apparatus is pulled out forward so that an image of the book original is read in a state where the upper unit is opened.

10 Claims, 10 Drawing Sheets

DISPLAY SYSTEM

CROSS-NOTING PARAGRAPH

This Non-provisional application claims priority under 35 U.S.C. §119(a) on Patent Application No. 2007-189285 filed in JAPAN on Jul. 20, 2007, the entire contents of which are hereby incorporated herein by reference.

FIELD OF THE INVENTION

The present invention relates to a display system, more specifically, to a display system provided with a large-sized display apparatus and a scanner apparatus disposed therebelow.

BACKGROUND OF THE INVENTION

Usually, a whiteboard used for a conference etc., includes printing means for printing the information, which is obtained by optically scanning information written by writing means such as a marking pen, on a thermal paper. When a conference is held using such a whiteboard, conference contents (image information) written on the whiteboard are printed on a thermal paper after the conference, and further an operation of such as distributing copies thereof to the conference participants is performed.

Further, in a conference using the usual whiteboard, it may be sometimes required to newly digitize the printed conference contents using a word processor etc., after the conference.

In order to solve the disadvantage above, for example, an electronic conference system is proposed, that conference contents are written on a large-sized display apparatus in a free format using input means such as a touch pen, and all of the written conference contents are digitized so that the document management, distribution to the participants, and processing of the contents can be easily performed after the conference.

Further, a system is also proposed, that a scanner apparatus is connected to a display apparatus through a network so that an additional original is digitized and captured in the display apparatus to be displayed on the display apparatus during a conference.

In such a display system including a large-sized display apparatus which is also applicable to an electronic conference, since the size of the system as a whole is increased, it has been required to reduce the size so that the installation space is effectively used. In this case, it is also required to consider the operability so that the convenience for users can not be degraded.

Japanese Laid-Open Patent Publication No. 10-333594 discloses the structure such that a falling preventive leg which can be stored in a pedestal is provided, and thereby, when a display apparatus is installed separated from a wall face, the falling preventive leg is protruded from the pedestal to prevent a fall of the display apparatus, and the falling preventive leg is stored in the pedestal so that the display apparatus is placed close to the wall face.

Further, Japanese Laid-Open Patent Publication No. 2000-29252 discloses a document feeder to realize a mechanism capable of stably muffling in a limited space at a low cost. Further, Japanese Laid-Open Patent Publication No. 6-9064 discloses a paper feed apparatus to obtain inexpensive and small-sized structure.

In the above display system including a large-sized display apparatus which is also applicable to an electronic conference, a scanner apparatus is connected to a display apparatus so that an original to be displayed on the display apparatus can be read on the spot and the convenience is improved, however, the scanner apparatus is not always necessary and it causes a problem when the scanner apparatus connected to the display apparatus is obstructive by contraries.

In this case, the structure that the scanner apparatus is disposed below the display apparatus is considered, which requires making the scanner apparatus more compact in order to dispose the scanner apparatus below the display apparatus. Further, this also requires providing a display system having an excellent operability and a compact structure without degrading the convenience in the scanner apparatus and the display system as a whole. Furthermore, in each of the Patent Publication above, the compact structure having an improved operability is not considered in such a display system including the large-sized display apparatus and the scanner apparatus.

SUMMARY OF THE INVENTION

An object of the present invention is to provide a display system provided with a large-sized display apparatus which is applicable to an electronic conference etc., and a scanner apparatus, which has a compact structure without degrading the operability.

Another object of the present invention is to provide a display system comprising: a display apparatus; and a scanner apparatus disposed below the display apparatus so as to be drawable to a front of the display apparatus, wherein the scanner apparatus has a lower unit provided with an image reading device for reading an image of an original, and an upper unit for feeding the original to the image reading device, the upper unit is attached so as to be openable and closable between the upper unit and a top face of the lower unit, a sheet-like original, an image of which is read by the image reading device, can be fed from a front face side of the upper unit, when the image of the sheet-like original is read, the image reading device reads the image of the original fed from the front face side, and when an image of a book original is read, the scanner apparatus is drawn out so that the image of the book original put on the lower unit is read in a state where the upper unit is opened.

Another object of the present invention is to provide the display system as defined in claim 1, wherein a front face side of the upper unit has an insertion port from which the sheet-like original is inserted, and the scanner apparatus feeds the original fed to the insertion port to the image reading device.

Another object of the present invention is to provide the display system as defined in claim 1, wherein a front face side of the upper unit has a discharge port from which the sheet-like original is discharged, and the scanner apparatus discharges the original, the image of which has been read by the image reading device, to outside from the discharge port.

Another object of the present invention is to provide the display system as defined in claim 1, wherein the upper unit is connected rotatably to the lower unit, and a side where an operation input portion for enabling an operation input to the display apparatus is disposed is opened to rotate the upper unit, so that the upper unit is made in a state of being opened.

Another object of the present invention is to provide the display system as defined in claim 1, wherein the upper unit is connected rotatably to the lower unit, and a side where a touch pen holder for holding a touch pen to write information on the display apparatus is disposed is opened to rotate the upper unit, so that the upper unit is in a state of being opened.

Another object of the present invention is to provide the display system as defined in any one of claims 1 through 5, wherein the scanner apparatus can execute processing of reading the book original and recovery processing by a user in the case of an original jam, at a same drawn out position.

PREFERRED EMBODIMENTS OF THE INVENTION

Figure 1:
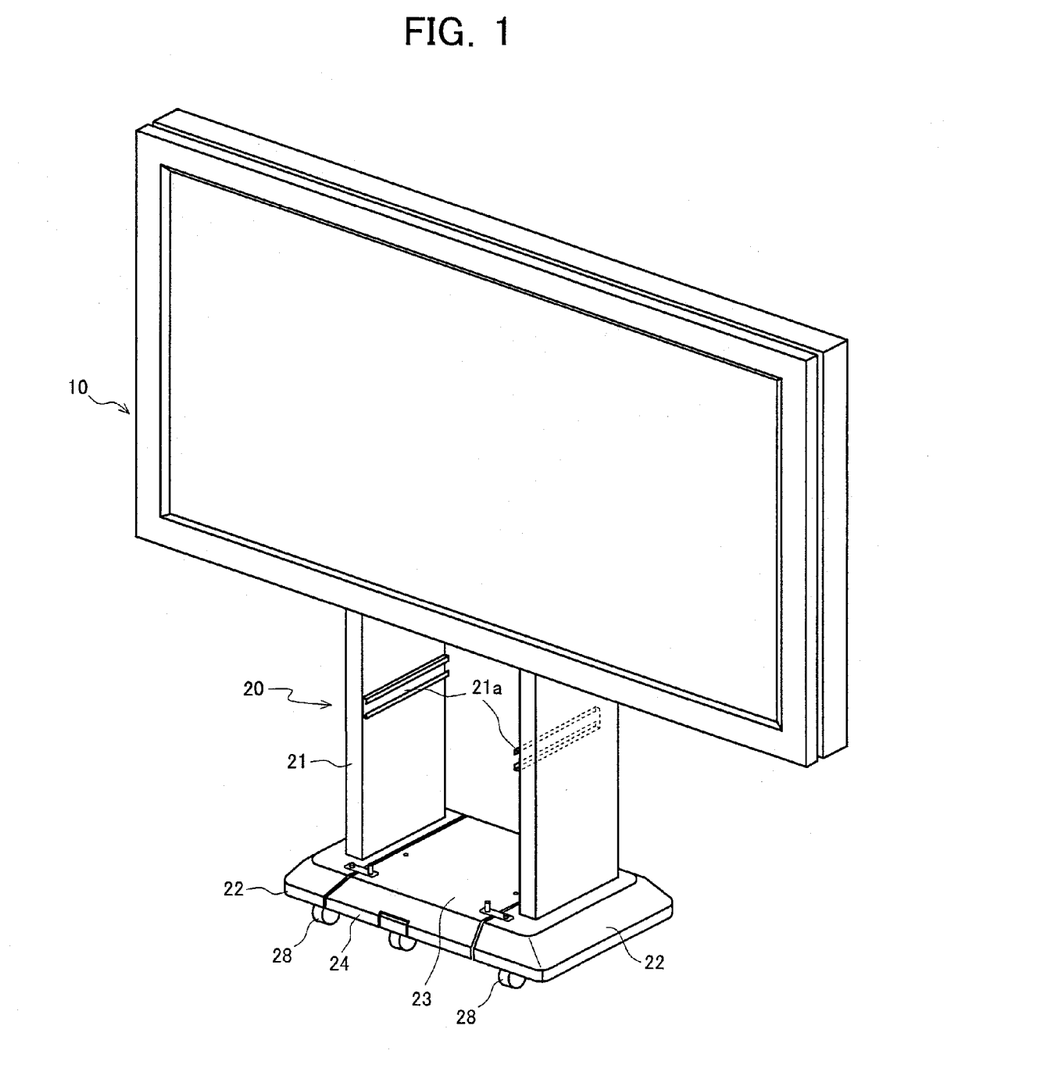
FIG. 1 is a diagram showing a structural example of a display system according to the present invention.

FIG. 1 is a diagram showing a structural example of a display system according to the present invention, which shows a pedestal (stand) provided with a mounting base on which a scanner apparatus can be disposed and a display apparatus supported by the pedestal. As shown in FIG. 1, the display system of the present embodiment is configured so that a large-sized display apparatus 10 is installed on a pedestal 20. In addition, electronic equipment such as a printer (not shown) can be placed on a mounting base 23 of the pedestal 20.

The pedestal 20 which supports the display apparatus 10 includes a pair of right and left legs 21, a base 22, and a falling preventive leg 24. The falling preventive leg 24 is disposed so as to be slidable back and forth with respect to the base 22, and the mounting base 23 is formed on the upper face side thereof. Further, casters (wheels for moving) 28 are provided on the bottom parts of the base 22 and the falling preventive leg 24, which make the whole of the display system movable.

Further, rails 21a are provided in the inside of each of the legs 21, and a slide member (not-shown) of a scanner apparatus is engaged therewith so that the scanner apparatus is disposed so as to be pulled out freely. Thereby, the scanner apparatus can move freely between a state of being stored between the pair of legs 21 of the pedestal 20 and a state of being pulled out to a front face side of the display apparatus 10.

Figure 2A:
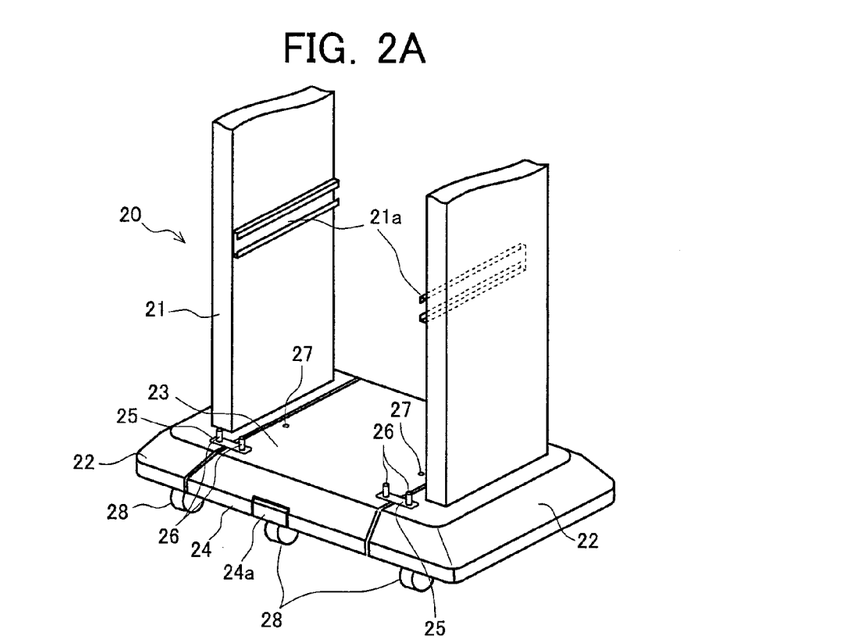
FIGS. 2A and 2B are diagrams illustrating a function of a falling preventive leg provided in a pedestal.
Figure 2B:
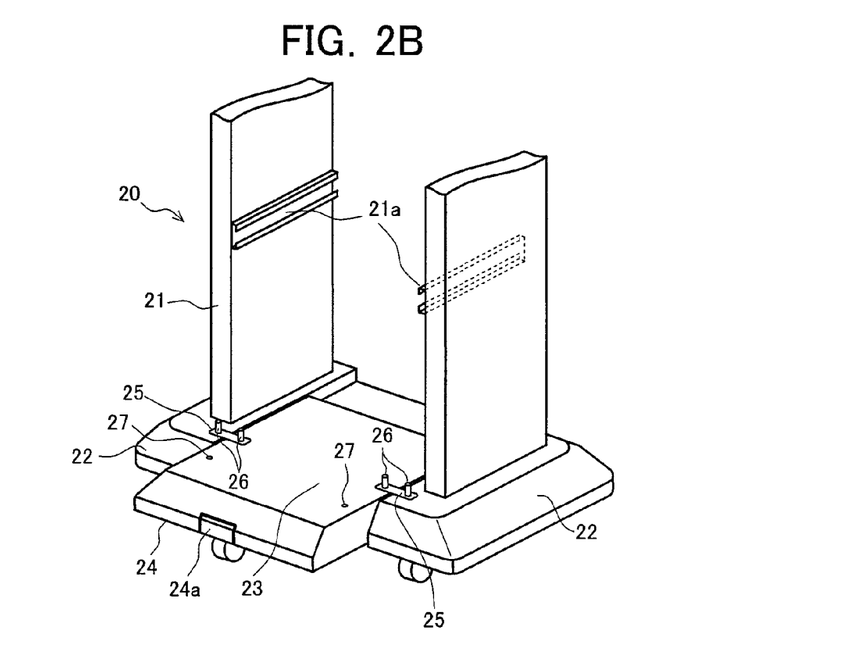

FIGS. 2A and 2B are diagrams illustrating a function of the falling preventive leg provided in the pedestal. The falling preventive leg 24 is attached so as to be slidable back and forth with respect to the base 22, as described above.

Here, a latch plate for fixing 25 is used to fix the base 22 and the falling preventive leg 24 each other. Through holes through which fixing pins 26 are inserted are provided on the right and left sides of the latch plate for fixing 25. On the other hand, the falling preventive leg 24 and the base 22 are provided with fixing holes 27 to which the fixing pins 26 are inserted, respectively, and the fixing pin 26 is inserted to each of the fixing holes 27 through the through holes of the latch plate for fixing 25 so that the falling preventive leg 24 and the base 22 are fixed each other through the latch plate for fixing 25. In the side of the falling preventive leg 24, a plurality of fixing holes 27 are provided in advance depending on the position where the falling preventive leg 24 is fixed.

In addition, the falling preventive leg 24 is shifted from a state of being stored between the base 22 (FIG. 2A) into a state of being pulled out forward (FIG. 2B), and thereby it is possible to improve the falling preventive function in the display system.

Here, the fixing pins 26 in the side of the falling preventive leg 24 are pulled out from the fixing holes 27 in the state of FIG. 2A and the falling preventive leg 24 is pulled out forward so as to be in the state of FIG. 2B, followed by inserting the fixing pins 26 to the other fixing holes 27 on the falling preventive leg 24 at this position, resulting that the falling preventive leg 24 and the base 22 are fixed each other.

When the falling preventive leg 24 is pulled out to the front face side, a user grasps and pulls a releasing lever 24a provided on the falling preventive leg 24 so that the falling preventive leg 24 can be pulled out. Note that, in the structure that the falling preventive leg 24 and the base 22 are fixed each other, not only the structure of using the above fixing pins 26, but any other appropriate fixing structures are employable.

Figure 3:
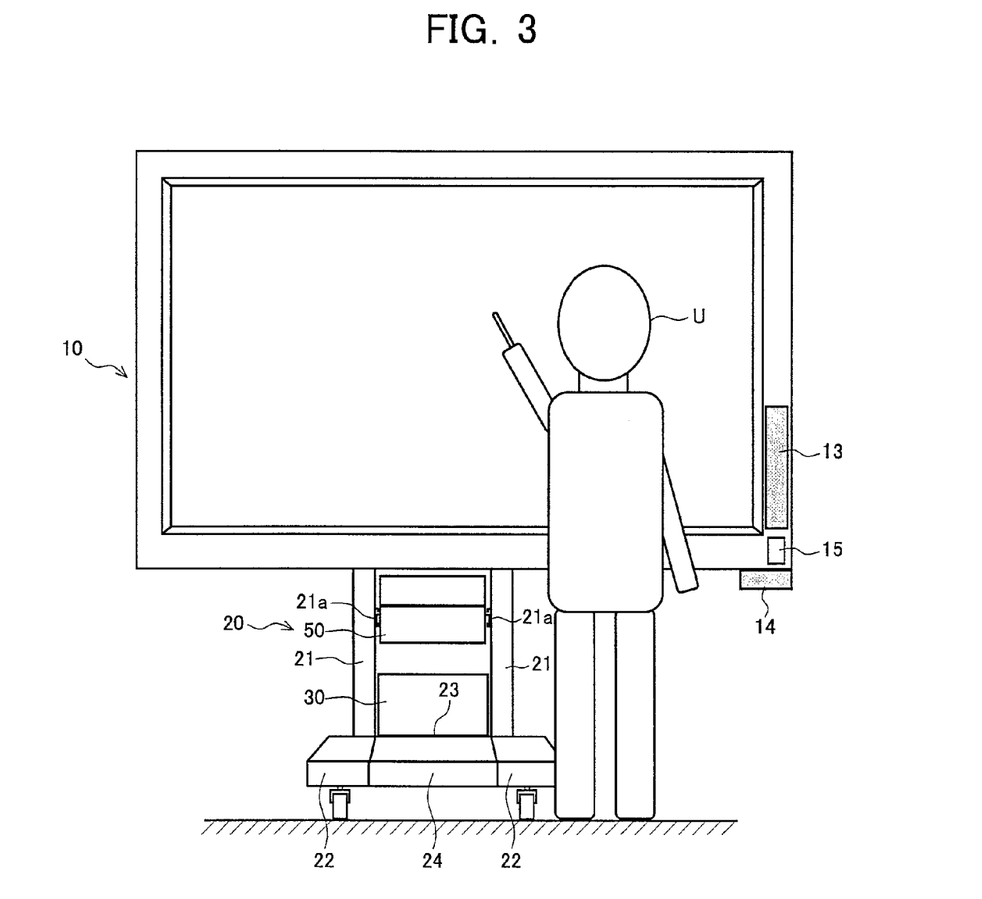
FIG. 3 is a diagram illustrating an example of the usage form of the display system according to the present invention.

FIG. 3 is a diagram illustrating an example of the usage form of the display system according to the present invention. As described above, the display system includes the pedestal 20 and the large-sized display apparatus 10 installed on the pedestal 20. In addition, electronic equipment such as a printer 30 can be placed on the mounting base 23 formed on the upper face side of the falling preventive leg 24 of the pedestal 20. Further, on the rails 21a, each of which is installed inside of the pair of legs 21, the scanner apparatus 50 is disposed so as to be pulled out freely to the front face side. In addition, it is possible that an information processing apparatus such as a PC (not shown) can be disposed on the rear side of the display apparatus 10 so as to perform the control of causing the display apparatus 10 to display image data captured from the scanner apparatus 50 or causing the printer 30 to print out information written to the display apparatus 10.

Electronic equipment such as the scanner apparatus 50 and the printer 30 are stored in the above pedestal 20, and thereby the printer 30 and the scanner apparatus 50, which are not used at all times, can be stored below the display apparatus. Further, with such a structure, for example as shown in FIG. 3, a user U who gives a presentation or proceeds with a conference in front of the display apparatus 10 can use the display system without being disturbed from such electronic equipment.

Further, the display apparatus 10 is provided with an operation input portion 13 used for setting a display of an initial screen etc., a touch pen holder 14 for storing a touch pen for arbitrarily writing on the display apparatus 10, and a power switch 15 of the display apparatus 10. In the present embodiment, although these are located in the lower part of the right end facing a display screen of the display apparatus 10 in consideration of the operability of the user, the position is not limited thereto.

Figure 4:
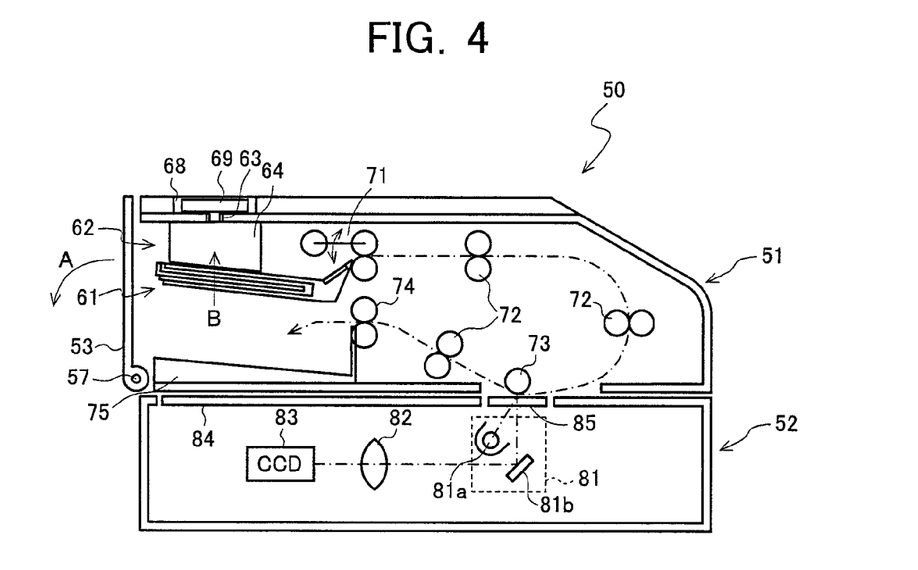
FIG. 4 is a diagram illustrating a structural example of a scanner apparatus included in the display system according to the present invention.

FIG. 4 is a diagram illustrating a structural example of the scanner apparatus included in the display system according to the present invention, which schematically shows the inside structure of a housing of the scanner apparatus when viewed from the side face.

The scanner apparatus 50 is composed of an upper unit 51 provided with an automatic document feeder for feeding originals from a stacked original bundle sequentially, and a lower unit 52 provided with an image reading device including a CCD (Charge Coupled Device) image sensor.

The upper unit 51 includes a paper feed tray 61 in which an original bundle composed of a plurality of originals is stacked, a size guide rack mechanism 62 having a function of detecting a size of an original, a paper feed roller 71 for taking out sheet originals in the paper feed tray 61 sheet by sheet, a plurality of feed rolls 72 for feeding a taken original to the downstream side, a press-contact roller 73 for putting an original in press-contact with a platen glass (second platen glass 85), a paper discharge roller 74 for discharging an original which has been read by the CCD image sensor, and a paper discharge tray 75 in which discharged originals are stacked.

Further, a front door 53 is provided in the front face side (left side in FIG. 4) of the upper unit 51 and is rotatable to a direction of an arrow A on a revolving shaft 57. Thereby, the inner part of the scanner apparatus 50 can be opened to the front face side, so that an operation of supplying originals to the paper feed tray 61 or an operation of taking out originals discharged to the paper discharge tray 75 can be performed from the front face side. In addition, the front door 53 also functions as a paper discharge tray for a large-sized original in a state of being opened to the front face side.

Further, in the present embodiment, the front door 53 includes an insertion port from which originals are inserted to feed to the document feeder, and a discharge port from which read originals are discharged, both of which are not shown. The structure of these ports will be described below.

The scanner apparatus 50 is configured such that the document feeder in the above upper unit 51 is supported by an apparatus frame of the lower unit 52 and an image of an original fed by the document feeder is read by the image reading device in the lower unit 52.

The lower unit 52 includes a scan unit 81 which has an exposure lamp 81a for exposing an image surface of an original and a mirror 81b for changing the course of a reflected light image from the original toward a predetermined direction, an imaging lens 82 for optically reducing a light image obtained from the mirror 81b of the scan unit 81, and a CCD image sensor 83 for sequentially applying photoelectric conversion to the optical image formed by the imaging lens 82 to output as en electric signal.

Further, the apparatus frame of the lower unit 52 includes a first platen glass 84 on which an original, an image of which is to be read, is placed in a stationary state, and a second platen glass 85 for forming an opening for light to read an original fed by the document feeder in the upper unit 51. Furthermore, the lower unit 52 includes a shifting mechanism (not shown) for setting the scan unit 81 at rest under the platen glass 85 or causing the scan unit 81 to scan over the first platen glass 84, so as to read an image. Then, the image signal obtained by the CCD image sensor 83 is transmitted to a signal processing circuit (not shown).

The size guide rack mechanism 62 is provided above the paper feed tray 61. Here, an operation member 69 is disposed on a recessed part 68 on the top face part of the apparatus. The operation member 69 passes through a slot guide 63 provided on the upper wall of the frame for forming the recessed part 68 so as to be coupled to a size guide 64. Such a structure realizes a compact structure and makes it possible to operate the size guide 64 from outside of the apparatus.

Figure 5:
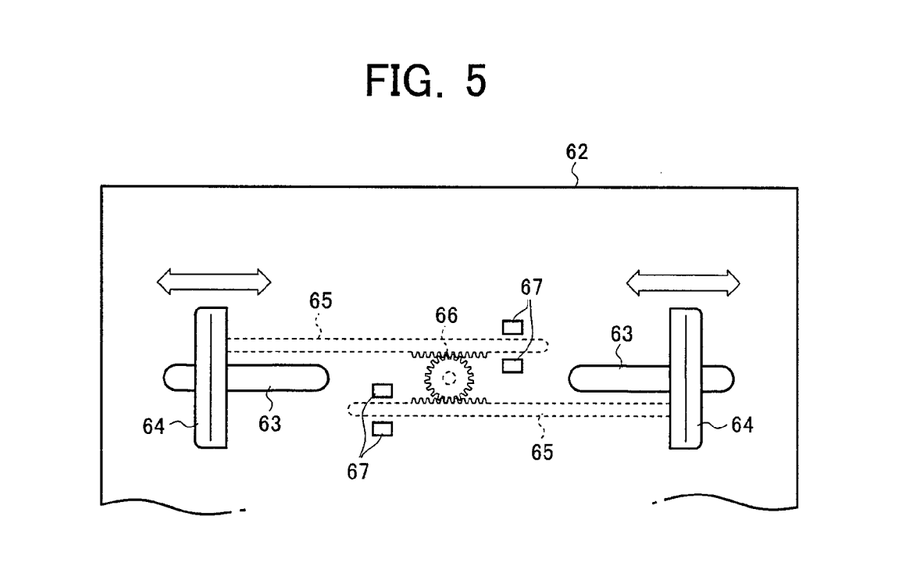
FIG. 5 is a diagram illustrating the structure of a size guide rack mechanism for detecting a size of an original stacked on a paper feed tray.

FIG. 5 is a diagram illustrating the structure of the size guide rack mechanism for detecting a size of an original stacked in the paper feed tray, which schematically shows the structure of the size guide rack mechanism when viewed from the side of the paper tray 61 (arrow B of FIG. 4). Here, a lateral direction of FIG. 5 corresponds to a direction vertical to the paper surface in FIG. 4.

In the size guide rack mechanism 62, the position of a rack 65 in the inside is detected when laterally moving (sliding) the size guide 64 in accordance with a size of an original, and thereby the size of the original can be detected.

Each of the right and left size guides 64 can be moved individually in a lateral direction by the slot guides 63. These size guides 64 are slidable by the operation member 69 (refer to FIG. 4) attached from the outside of the apparatus.

Each of the size guides 64 is attached with the rack 65 engaged with a pinion 66, and further, a sensor 67 is disposed on each of the leading edge portions of the racks 65. Thereby, the sensor 67 detects the position of the rack 65 when laterally sliding the size guide 64 in accordance with the size of the original, thus the size of the original can be detected.

Figure 6:
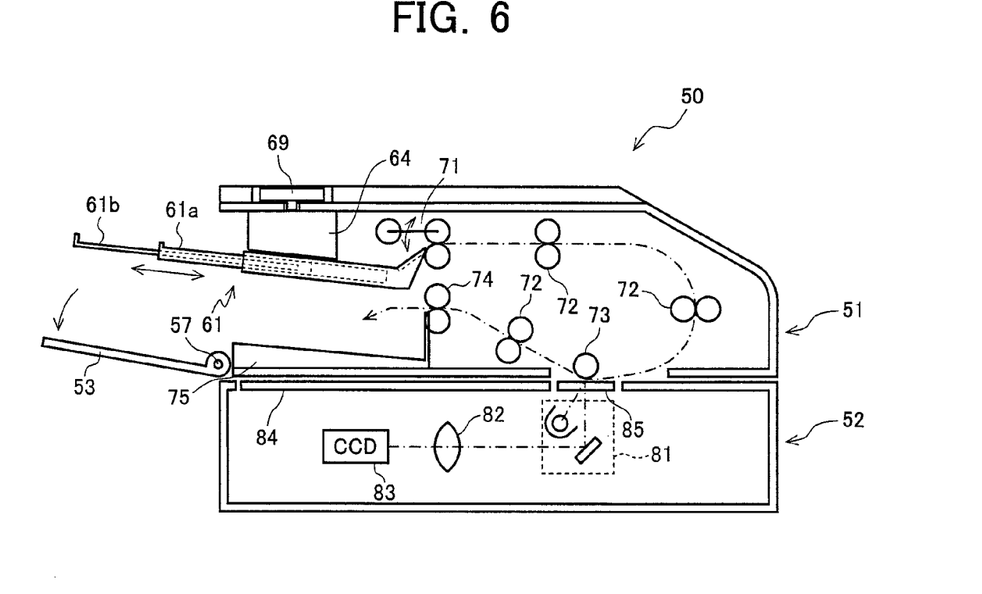
FIG. 6 is a diagram showing a state where the paper feed tray of the scanner apparatus shown in FIG. 4 is pulled out.

FIG. 6 is a diagram showing a state where the paper feed tray of the scanner apparatus shown in FIG. 4 is pulled out. The paper feed tray 61 includes auxiliary trays 61a and 61b therein, and the auxiliary trays 61a and 61b can be pulled out. Further, when the scanner apparatus 50 is used, the front door 53 provided in the front face side of the scanner apparatus 50 is rotatingly opened forward, so as to be usable as a paper discharge tray.

With such a structure, when an original has a size such that the original can not be stored in the apparatus, the front door 53 is opened and the auxiliary trays 61a and 61b are pulled out from the paper feed tray 61, so as to be applicable to a large-sized original. Here, the auxiliary trays 61a and 61b thus pulled out are used to feed a large-sized original so that the large-sized original can be stacked by the discharge tray whose area has been expanded by the front door 53.

Figure 7A:
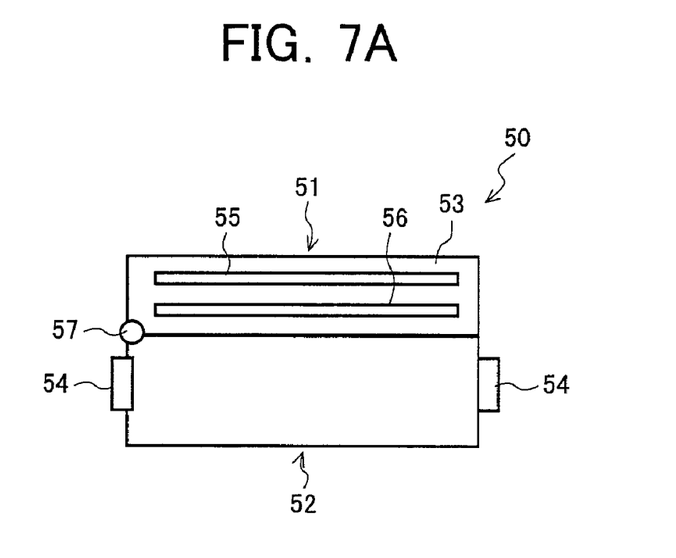
FIGS. 7A and 7B are diagrams schematically showing the structure of the scanner apparatus shown in FIGS. 4 to 6 when viewed from the front face.
Figure 7B:
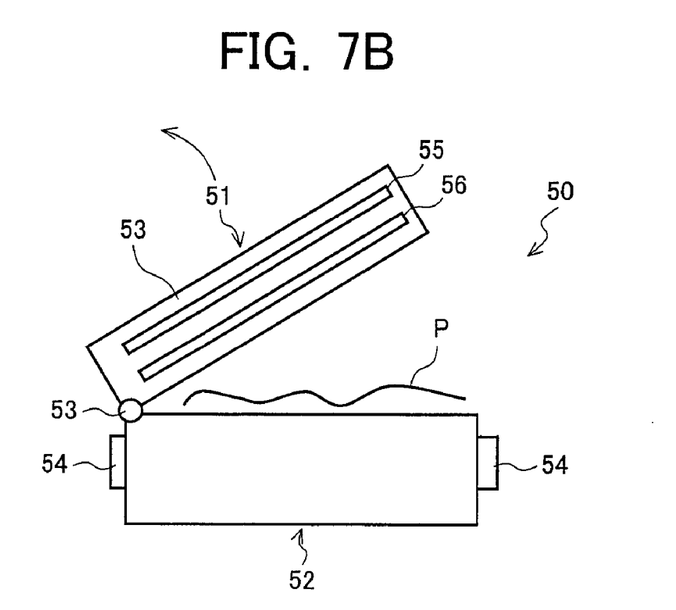

FIGS. 7A and 7B are diagrams schematically showing the structure of the scanner apparatus shown in FIGS. 4 to 6 above when viewed from the front face, where FIG. 7A shows the scanner apparatus in which the upper unit is closed, and FIG. 7B shows the scanner apparatus in which the upper unit is opened.

As described above, the scanner apparatus 50 is composed of the upper unit 51 provided with the automatic document feeder and the lower unit 52 provided with the image reading device. In addition, the upper unit 51 and the lower unit 52 are connected so as to be rotatable each other like hinged on a revolving shaft 57. Thereby, the upper unit 51 can be opened upward from the top face of the lower unit 52. That is, by opening the upper unit 51 as shown in FIG. 7B, platen glasses (the first platen glass 84 and the second platen glass 85) provided on the top face of the second unit 52 are exposed so that a book original can be read. Further, in a state where the upper unit 51 is closed as shown in FIG. 7A, a sheet-like original is fed by the automatic document feeder in the upper unit 51 so that an image of the original can be read by the image reading device in the lower unit 52.

The front door 53 of the upper unit 51 is provided with an insertion port 55 from which originals are inserted, and a discharge port 56 from which read originals are discharged. A sheet-like original is inserted to the insertion port 55, and thereby the original can be put on the paper feed tray 61 shown in FIG. 6. In addition, an original discharged from the paper discharge roller 74 of FIG. 6 can be discharged to the outside from the discharge port 56. In this case, the original can be fed and discharged in a state where the front door 53 is closed.

Further, by opening the front door 53, it is possible to put an original directly on the paper feed tray 61, and to remove an original discharged from the paper discharge roller 74. Here, in such a case that the size of an original is large as described above, the front door 53 is opened and the auxiliary trays 61a and 61b are pulled out, so that the original can be fed and discharged stably.

With such a structure that the insertion port 55 for inserting an original and the discharge port 56 for discharging a read original are provided in the front face side of the scanner apparatus 50, when a sheet-like original is caused to be read, a user can feed and discharge the original by operating from the front face side of the scanner apparatus. In addition, such a structure makes it possible to perform reading and discharging of the sheet-like original in a state where the scanner apparatus 50 is stored between legs 21 of the pedestal 20.

On the other hand, when a book original is caused to be read, it is necessary that the upper unit 51 is opened to expose the platen glass on the top face of the lower unit 52. In this case, the scanner apparatus 50 is pulled out from the pedestal 20 to the front face side thereof, so that the upper unit 51 is rotatingly opened in a state where an operation of opening the upper unit 51 is not interfered. Then, the book original is put on the first platen glass 84 of the lower unit and the image reading device is operated to read the book original.

Further, when a jam that a fed original is jammed occurs within the scanner apparatus 50, it is necessary that the upper unit 51 is opened to remove the jammed original. In this case also, in a state where the scanner apparatus 50 is pulled out forward from the pedestal 20, the upper unit 51 is opened and a part of a feeding path is released to remove a jammed original P. That is, the scanner apparatus 50 is able to perform processing of reading a book original and recovery processing in the case of an original jam by a user, at the same pulled-out position.

In this way, in the case of a sheet-like original, the scanner apparatus 50 is stored between the legs 21 of the pedestal 20, and thereby it is possible to use the space in the front face side of the display system effectively. In addition, the scanner apparatus 50 is pulled out to the front side at the time of reading a book original or performing recovery processing in the case of an original jam, and thereby these processing can be performed easily.

Figure 8A:
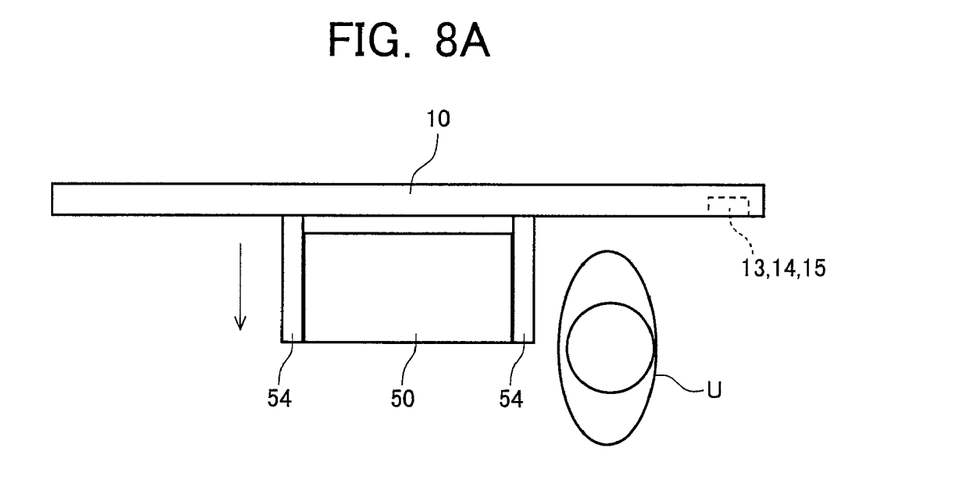
FIGS. 8A and 8B are diagrams schematically showing the structure of the display system when viewed from the above.
Figure 8B:
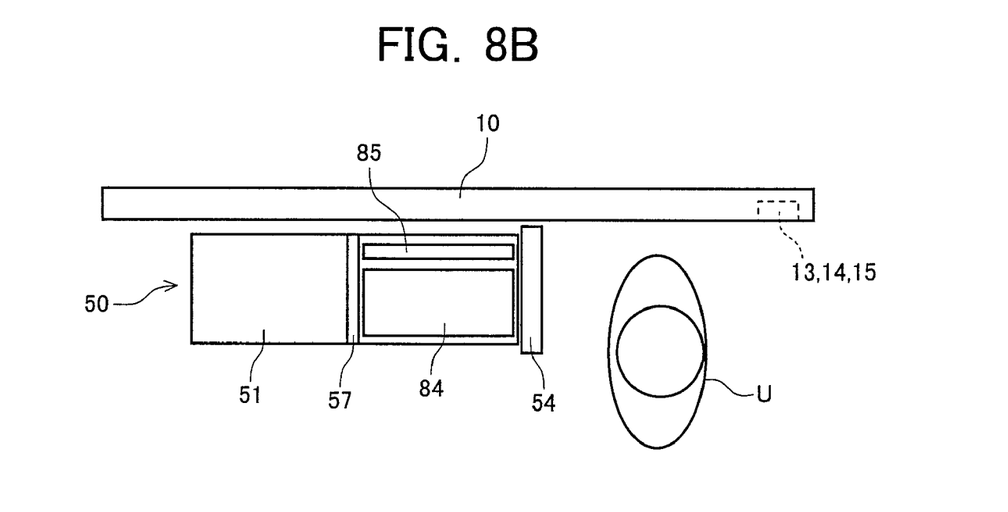

FIGS. 8A and 8B are diagrams schematically showing the structure of the display system when viewed from above, where FIG. 8A shows a state where the scanner apparatus is pulled out forward, and FIG. 8B shows a state where the upper unit of the scanner apparatus is opened to expose the top face of the lower unit.

As described above, the upper unit 51 of the scanner apparatus 50 is opened in a state where the scanner apparatus 50 is pulled out to the front of the display apparatus 10, and thereby it is possible to read a book original and perform recovery processing in the case of an original jam.

In this case, when the upper unit 51 is opened, it is suitable that the upper unit is opened to the opposite side to a user U so as not to interfere the user U. For example, as shown in FIG. 8B, the upper unit 51 of the scanner apparatus 50 is opened to the left side which is opposite to the right side (right side facing a front screen of the display apparatus) where the user U stands. That is, the revolving shaft 57 which connects the upper unit 51 rotatably with respect to the lower unit 52 is provided in the left side of the apparatus that is opposite to the right side of the apparatus where the user U stands, so that the upper unit 51 is rotatingly opened on the revolving shaft 57. Since the first platen glass 84 for reading a book original is exposed in a state where the upper unit 51 is opened, by putting a book original thereon, the user U can perform reading of an image of the book original.

As described above, the display apparatus 10 is provided with the operation input portion 13 used for setting a display of an initial screen etc., the touch pen holder 14 in which a touch pen for arbitrarily writing on the display apparatus 10 is stored, and the power switch 15 of the display apparatus 10. In view of the operability of the user U, these are provided in the lower part of the right end facing the display screen of the display apparatus 10. The user U stands on the right side of the scanner apparatus 50 facing the display screen of the display apparatus 10 so as to be able to operate them and operate the scanner apparatus 50.

Accordingly, it is preferable that the upper unit 51 is configured such that the side where the operation input portion 13 is disposed is opened so as to rotate to the opposite side thereof. Similarly, it is also preferable that the upper unit 51 is configured such that the side where the touch pen holder 14 is disposed is opened so as to rotate to the opposite side thereof. Alternatively, it may be configured so that the side where the power switch 15 is disposed is opened.

In this case, the side where the operation input portion 13 is disposed indicates the side where a wall face close to the operation input portion 13 of the display apparatus exists among wall faces constituting side walls of the upper unit 51. When the wall face side of the upper unit 51 is lifted up to rotate the upper unit 51 around the revolving shaft 57, a gap between the lower face of the upper unit 51 and the top face of the lower unit 52 increases so that the platen glass on the top face of the upper unit 51 can be exposed. That is, the revolving shaft 57 is provided on the lower part of the wall face opposite to the wall face close to the above operation input portion 13. That is the same as the sides where the touch pen holder 14 and the power switch 15 are disposed.

Further, when the operation input portion 13, the touch pen holder 14, and the power switch 15, etc., are provided in the left side facing the display screen, the revolving shaft 57 of the upper unit 51 is provided on the opposite right side so that the left side of the upper unit is opened and rotated.

Figure 9:
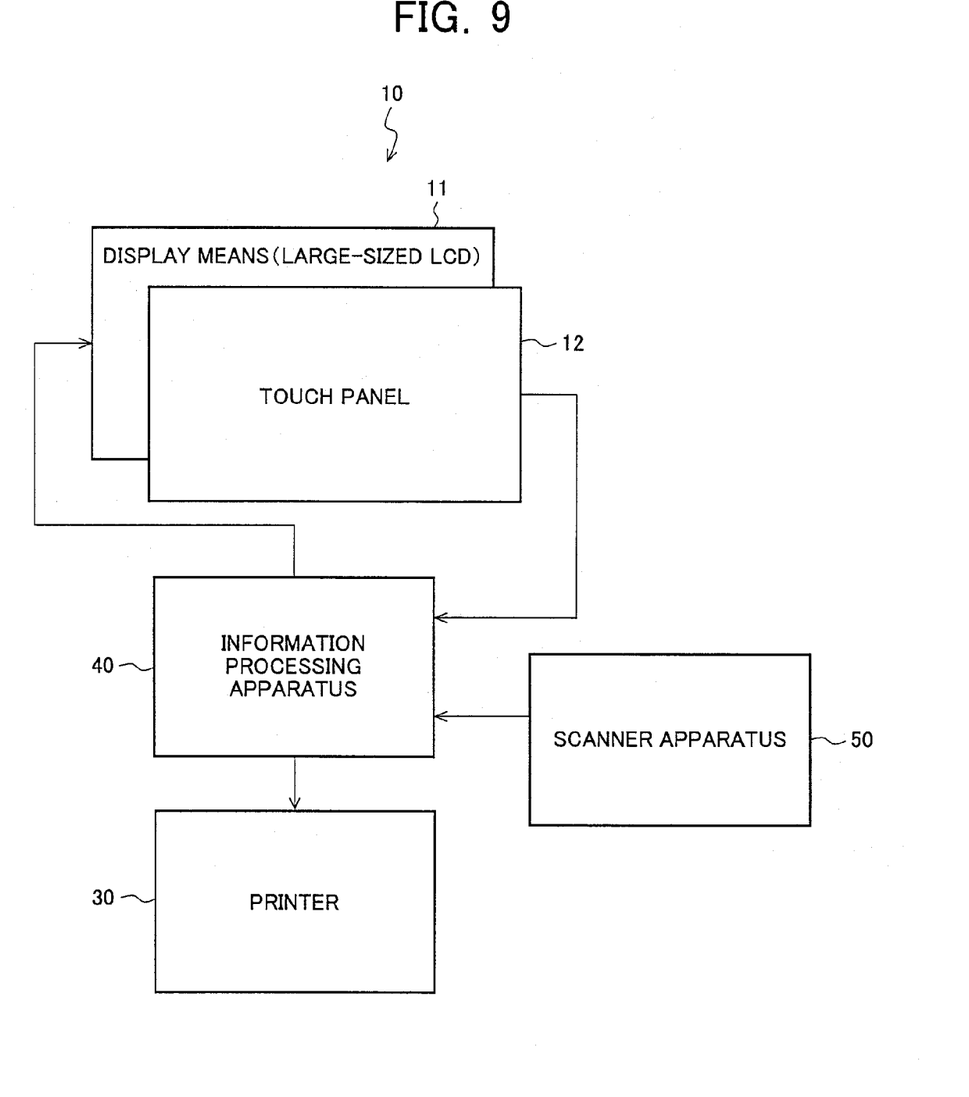
FIG. 9 is a block diagram illustrating a structural example of the display system according to the present invention.

FIG. 9 is a block diagram illustrating a structural example of the display system according to the present invention.

The display apparatus 10 includes display means 11, and a touch panel 12 provided on a front face side of the display means 11. As the display means 11, for example, a large-sized LCD (liquid crystal display) is applicable. In addition, the touch panel 12 detects a coordinate of the touched position by a user etc., to transmit to an information processing apparatus 40.

The information processing apparatus 40 controls a display image displayed by the display means 11, and causes the display apparatus 10 to display various information in accordance with coordinate information of the touched position detected by the touch panel 12. For example, a touch pen is used to perform processing of causing the display means 11 to display information such as characters drawn on the touch panel 12. As the information processing apparatus 40, for example, a PC (personal computer) is used.

The printer 30 prints out display information displayed by the display means 11. Here, image information displayed by the display means 11 is outputted to the printer 30 by the control of the information processing apparatus 40, and thereby the display information on the display means 11 can be print out by the printer 30. Further, the printer 30 can print out image data fetched by the scanner apparatus 50 which is connected to the information processing apparatus 40.

The scanner apparatus 50 is an apparatus for reading an image of an original to convert it into electronic signal, and outputs image data obtained by reading the original image to the information processing apparatus 40. The image data read by the scanner apparatus 50 can be displayed on the display means 11 by the control of the information processing apparatus 40. In addition, as described above, it is also possible to print out from the printer 30.

The original, an image of which is read by the scanner apparatus 50, may be a sheet-shaped original or a book-shaped original (book original). In the embodiment according to the present invention, a sheet-like original can be read by feeding the original from the front face side of the scanner apparatus 50, and an image of a book original can be read by opening the upper unit 51 in a state where the scanner apparatus 50 is pulled out forward.

Further, in the above embodiment, although the information processing apparatus 40 such as a PC performs processing of displaying an image on the display means 11, or processing of outputting an image to the printer 30, the display apparatus 10 may incorporate an information processing apparatus having these functions of image processing. Further, the display apparatus 10 may include an information processing portion in which some of its processing functions are is distributed to the information processing apparatus 40 such as a PC.

Figure 10A:
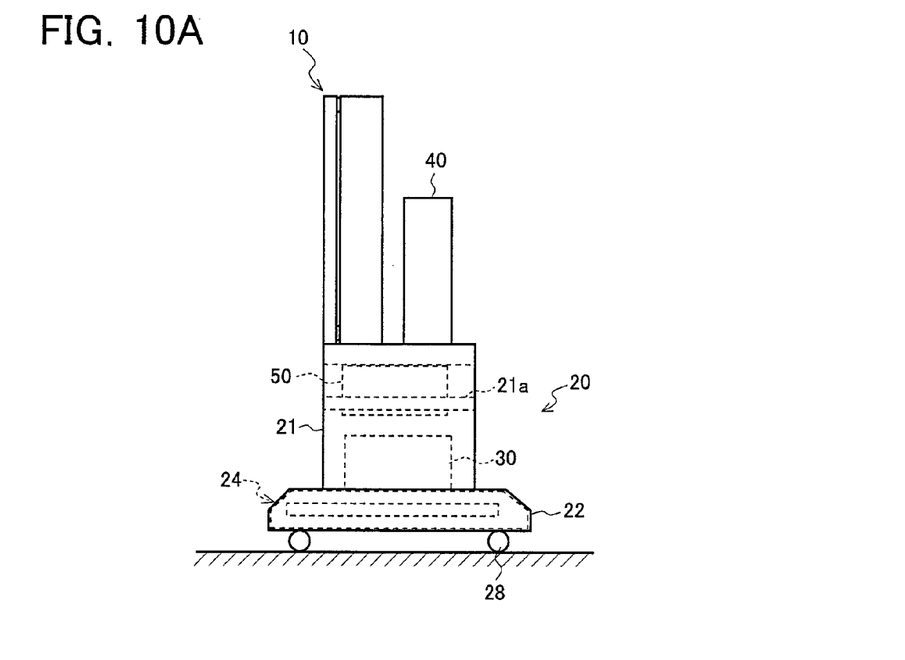
FIGS. 10A and 10B are diagrams showing a state of the display system shown in FIG. 3 when viewed from the side face.
Figure 10B:
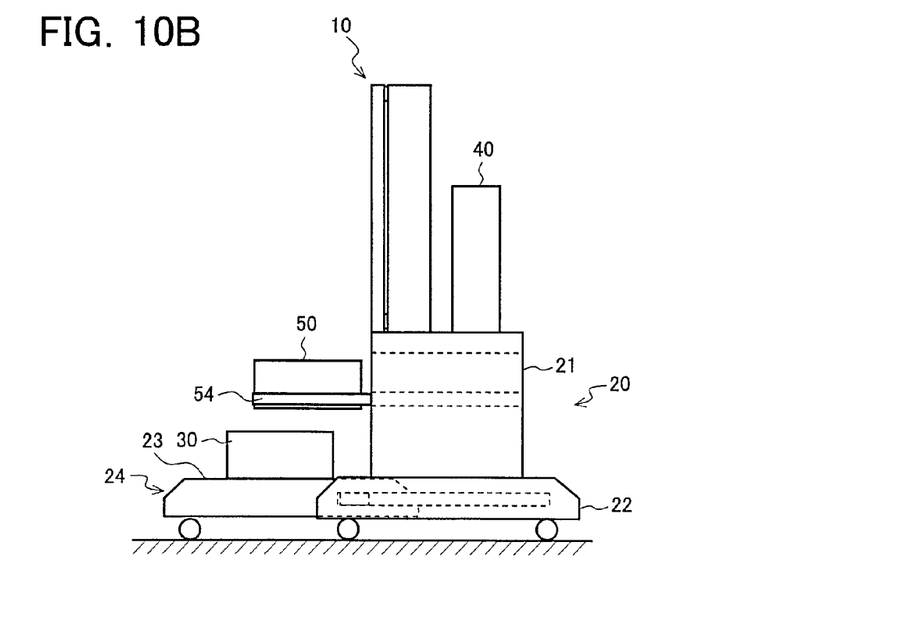

FIGS. 10A and 10B are diagrams showing a state where the display system shown in FIG. 3 is viewed from the side face, where FIG. 10A shows a state where the scanner apparatus 50 and the printer 30 are contained between the pair of legs 21, and FIG. 10B shows a state where the scanner apparatus 50 and the printer 30 are pulled out to the front of the display system.

The information processing apparatus 40 is disposed on the back face of the display apparatus 10. Further, the rails 21a are installed in the inside of the pair of legs 21 of the pedestal 20, and a slide member 54 attached on the scanner apparatus 50 is engaged with the rails 21a so that the scanner apparatus 50 is pulled out freely with respect to the legs 21.

When the scanner apparatus 50 stored between the pair of legs 21 in a state of FIG. 10A is pulled out by a user, the state of which turns into a state as shown in FIG. 10B. In this state, since the whole of the scanner apparatus 50 is pulled out to the front face side of the legs 21, the user can perform operations of the scanner apparatus 50 easily. At this position, processing of reading book original or recovery processing in the case of a jam can be performed.

Further, the falling preventive leg 24 is provided in the lower part of the pedestal 20, and by releasing the fix by the above mentioned fixing pins 26, the falling preventive leg 24 can be pulled out to the front face side of the display system. When the falling preventive leg 24 stored between the bases 22 in a state of FIG. 10A is pulled out by a user, the state of which turns into a state as shown in FIG. 10B. The printer 30 is put on the mounting base 23 formed on the top face of the falling preventive leg 24. Accordingly, in this state, since the whole of the printer 30 is pulled out to the front face side of the legs 21, the user can easily perform an operation of taking out a sheet printed by the printer 30, an operation of jam processing when a jam occurs in the printer, or an operation of replacing a developer cartridge.

Figure 11:
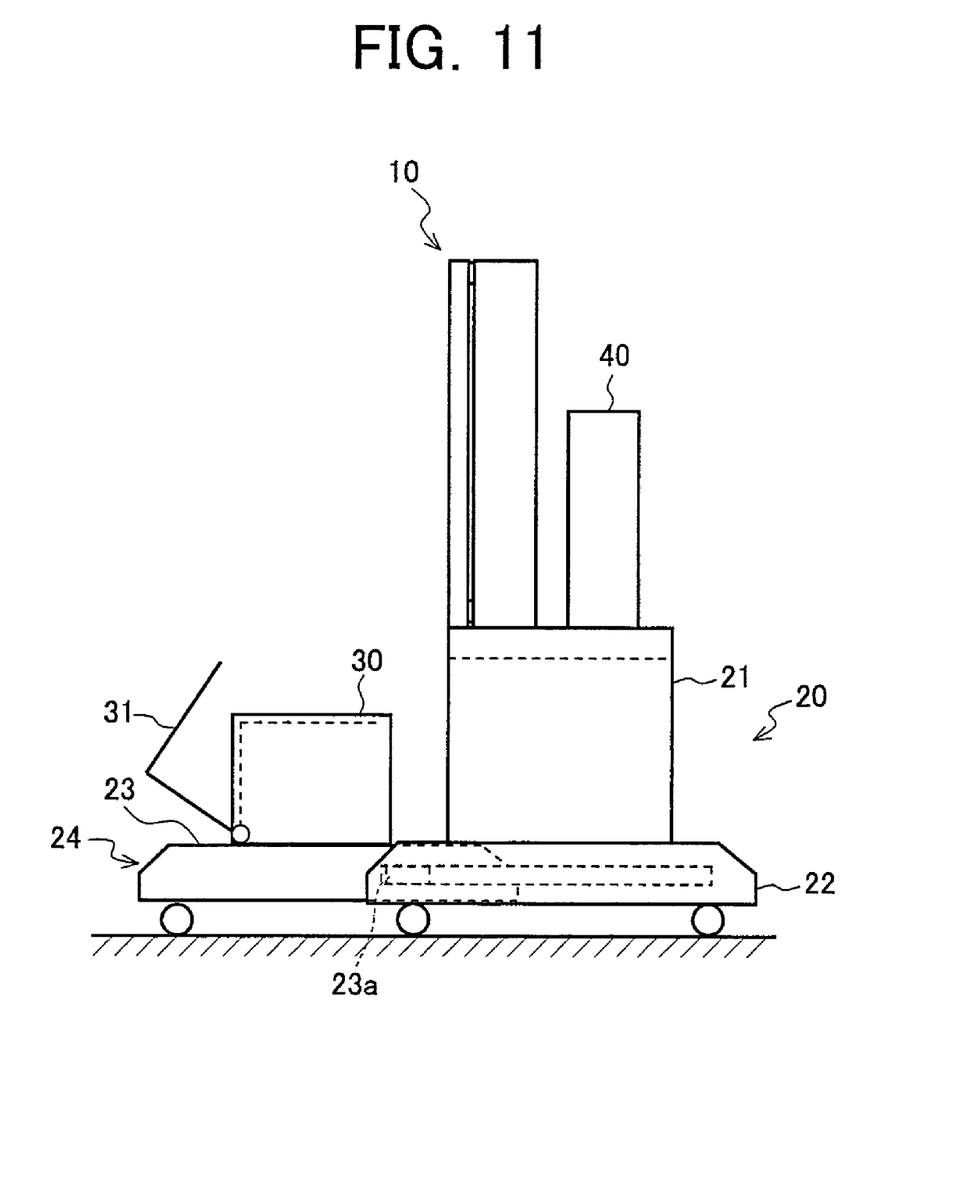
FIG. 11 is a diagram illustrating a state where maintenance of a printer is performed with the falling preventive leg being pulled out.

FIG. 11 is a diagram illustrating a state where maintenance of a printer is performed with the falling preventive leg being pulled out. As described above, the falling preventive leg 24 stored between the base 22 is pulled out forward, so that the printer 30 placed on the mounting base 23 of the falling preventive leg 24 can be pulled out. At this position, a cover 31 of the printer 30 can be opened as shown in FIG. 11. Thereby, it is possible to perform such as processing for paper jam or replace a developer cartridge. Here, as shown in FIG. 11, the cover 31 is opened to the front side so that the user can perform operation easily without disturbing a user of the display system.

According to the present invention, following effect can be obtained.

According to the present invention, in a display system provided with a large-sized display apparatus which is also applicable to an electronic conference and a scanner apparatus, a display system having the compact structure can be provided without degrading the operability.

The invention claimed is:

1. A display system comprising:
  a display apparatus; and
  a scanner apparatus disposed below the display apparatus so as to be drawable to a front of the display apparatus, wherein
  the scanner apparatus has a lower unit provided with an image reading device for reading an image of an original, and an upper unit for feeding the original to the image reading device,
  the upper unit is attached so as to be openable and closable between the upper unit and a top face of the lower unit,
  a sheet-like original, an image of which is read by the image reading device, can be fed from a front face side of the upper unit,
  when the image of the sheet-like original is read, the image reading device reads the image of the original fed from the front face side, and
  when an image of a book original is read, the scanner apparatus is drawn out so that the image of the book original put on the lower unit is read in a state where the upper unit is opened.

2. The display system as defined in claim 1, wherein the front face side of the upper unit has an insertion port from which the sheet-like original is inserted, and the scanner apparatus feeds the original fed to the insertion port to the image reading device.

3. The display system as defined in claim 2, wherein the scanner apparatus can execute processing of reading the book original and recovery processing by a user in the case of an original jam, at a same drawn out position.

4. The display system as defined in claim 1, wherein the front face side of the upper unit has a discharge port from which the sheet-like original is discharged, and the scanner apparatus discharges the original, the image of which has been read by the image reading device, to outside from the discharge port.

5. The display system as defined in claim 4, wherein the scanner apparatus can execute processing of reading the book original and recovery processing by a user in the case of an original jam, at a same drawn out position.

6. The display system as defined in claim 1, wherein the upper unit is connected rotatably to the lower unit, and a side where an operation input portion for enabling an operation input to the display apparatus is disposed is opened to rotate the upper unit, so that the upper unit is made in a state of being opened.

7. The display system as defined in claim 6, wherein the scanner apparatus can execute processing of reading the book original and recovery processing by a user in the case of an original jam, at a same drawn out position.

8. The display system as defined in claim 1, wherein the upper unit is connected rotatably to the lower unit, and a side where a touch pen holder for holding a touch pen to write information on the display apparatus is disposed is opened to rotate the upper unit, so that the upper unit is in a state of being opened.

9. The display system as defined in claim 8, wherein the scanner apparatus can execute processing of reading the book original and recovery processing by a user in the case of an original jam, at a same drawn out position.

10. The display system as defined in claim 1, wherein the scanner apparatus can execute processing of reading the book original and recovery processing by a user in the case of an original jam, at a same drawn out position.

* * * * *